Figure 1:
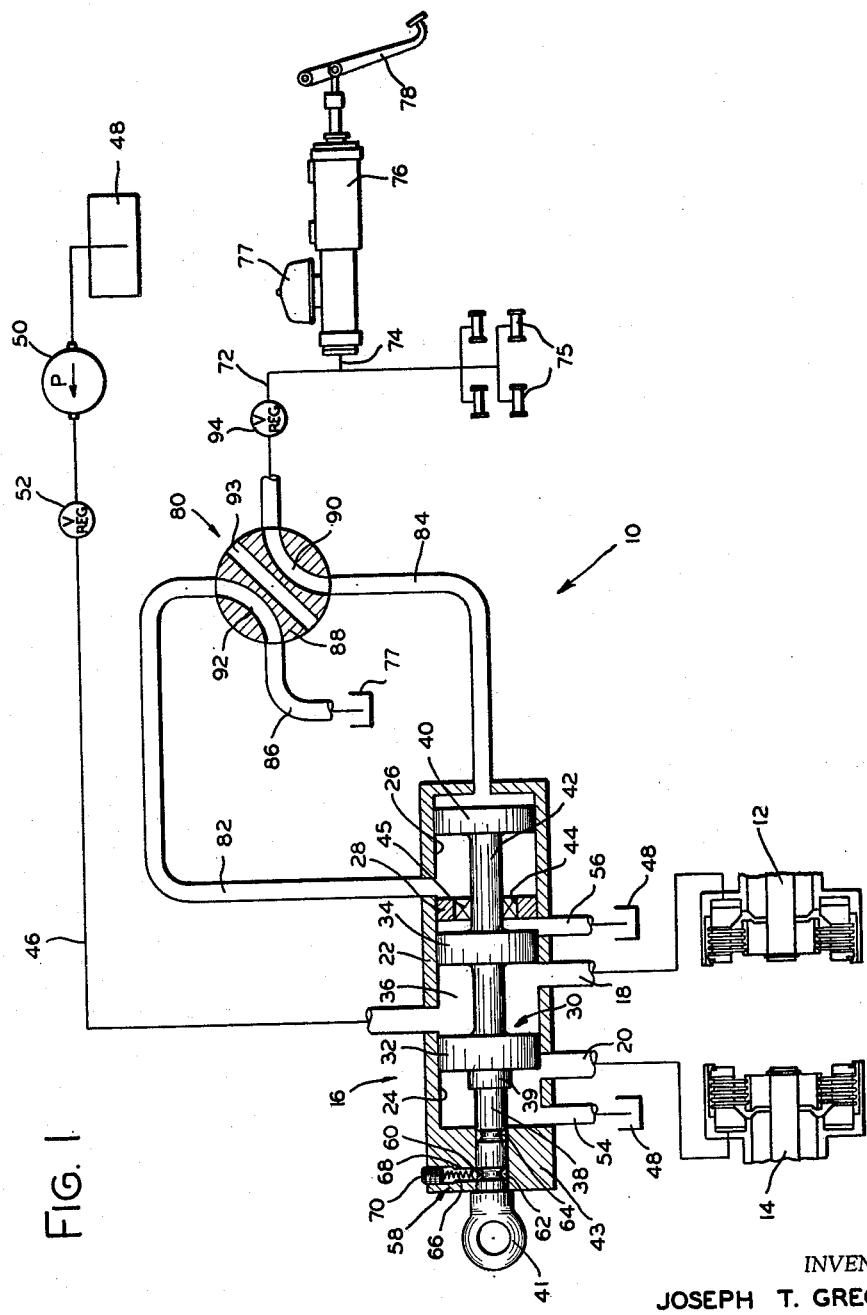

INVENTOR
JOSEPH T. GREGORICH
BY Kenneth C. Witt
ATTORNEY

June 2, 1964 J. T. GREGORICH 3,135,367
TRANSMISSION CONTROL
Filed Dec. 7, 1961 3 Sheets-Sheet 3

INVENTOR
JOSEPH T. GREGORICH
BY
*Kenneth C. Witt*
ATTORNEY

United States Patent Office 3,135,367
Patented June 2, 1964

3,135,367
TRANSMISSION CONTROL
Joseph T. Gregorich, Jackson, Mich., assignor to Clark Equipment Company, a corporation of Michigan
Filed Dec. 7, 1961, Ser. No. 157,798
4 Claims. (Cl. 192—4)

This invention relates to controls for power shifted transmissions, and more specifically to a brake actuated control for selectively engaging the direction controlling clutches of a power shifted transmission. This invention is particularly useful for tractor loaders, however, it will be readily recognized by those skilled in the art that it may be applied with equal facility to other vehicles including motor graders, bulldozers and others.

Some types of tractor loaders often are operated in such a manner that there are a large number of reversals in the direction of movement of the vehicle. For example, in a typical loading operation involving a tractor equipped with a bucket, the operator approaches a pile of material with the tractor and engages a load of material with the bucket. The operator then backs the tractor away from the material pile. After backing clear of the material pile, the tractor is moved forwardly to approach a truck, for example, into which the load is dumped. After dumping the load, the tractor is backed away from the truck, and once clear of the truck has its direction reversed so that it then moves forward to approach the material pile in order to pick up another load of material, thus completing one cycle. In such a work cycle as described, which involves four reversals of the direction of vehicle movement, if the cycle is two minutes in length, which is typical for such an operation, then there may be 960 such reversals during an eight work hour period.

The power train in a vehicle as described may include a hydrodynamic torque converter and a power shifted constant mesh gear transmission connected in series respectively with an engine to operate the drive wheels of the vehicle. An example of a gear transmission which is suitable for use in such a power train is disclosed and claimed in U.S. Patent No. 2,867,126 issued on January 6, 1959, and assigned to the same assignee as the present invention.

It has been found that operators of vehicles such as that described are prone to shift the power train of the vehicle from forward to reverse or vice versa while the vehicle is still moving, especially during the type of work cycle described hereinbefore. The result is that one of the direction controlling clutches in the gear transmission acts as a brake to stop the vehicle and must absorb the entire kinetic energy of the vehicle which is substantial in such a vehicle which may weigh many tons plus the load being carried. This energy is changed into heat in the clutch, and may cause the clutch to fail if the heat in the clutch becomes excessive. It is possible, of course, to carry heat away from the clutch by circulating coolant, air or oil, for example, past or through the clutch, as is well-known in the art. However, such clutch cooling means have not been entirely satisfactory for clutch usage which is as severe as outlined previously.

In order to avoid clutch failures under work cycles having a large number of vehicle direction reversals, I propose to make it desirable for the operator to bring the vehicle to a stop or almost to a stop by brake application prior to shifting the transmission to reverse the direction of vehicle movement. Therefore, a principal object of my invention is to provide a means for shifting a transmisison from a drive in one direction to a drive in the opposite direction upon brake application.

Another object of my invention is to provide means for reducing the severity of clutch usage under certain work conditions.

In carrying out my invention in a preferred embodiment I provide a direction control valve for selectively causing a transmission to provide drive in one direction or the reverse thereof. The valve is operatively connected to the vehicle braking system via a regulator valve and a shift selector valve so that brake application which results in a predetermined pressure in the brake system causes the direction control valve to shift the transmission from forward to reverse or vice versa, depending upon the position of the shift selector valve. Also, the direction control valve can be disconnected from the brake system so that brake application has no effect upon the direction of vehicle movement.

Figure 2:
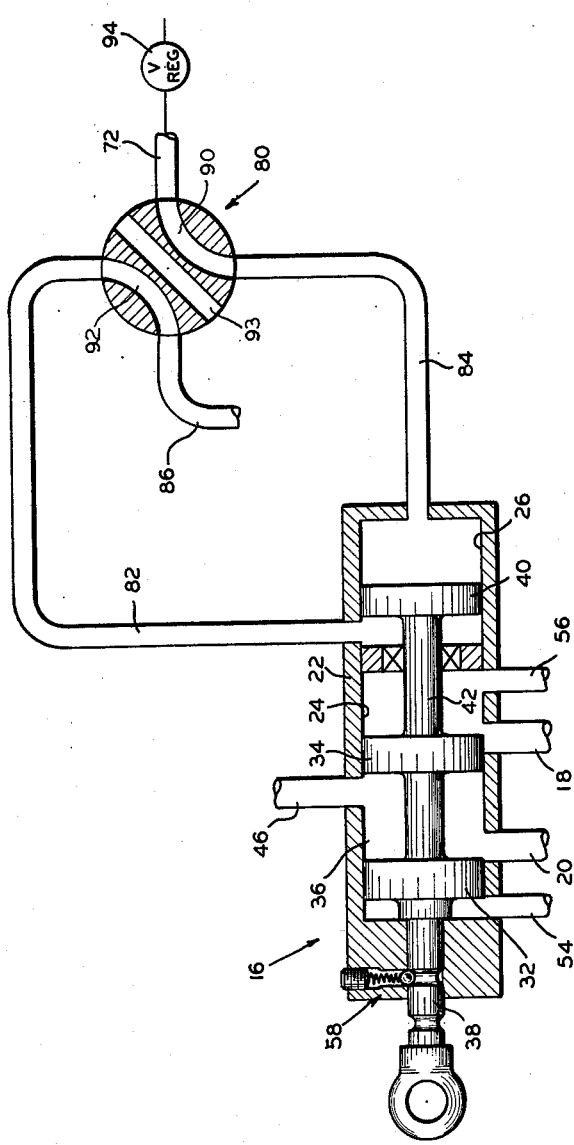
Figure 3:
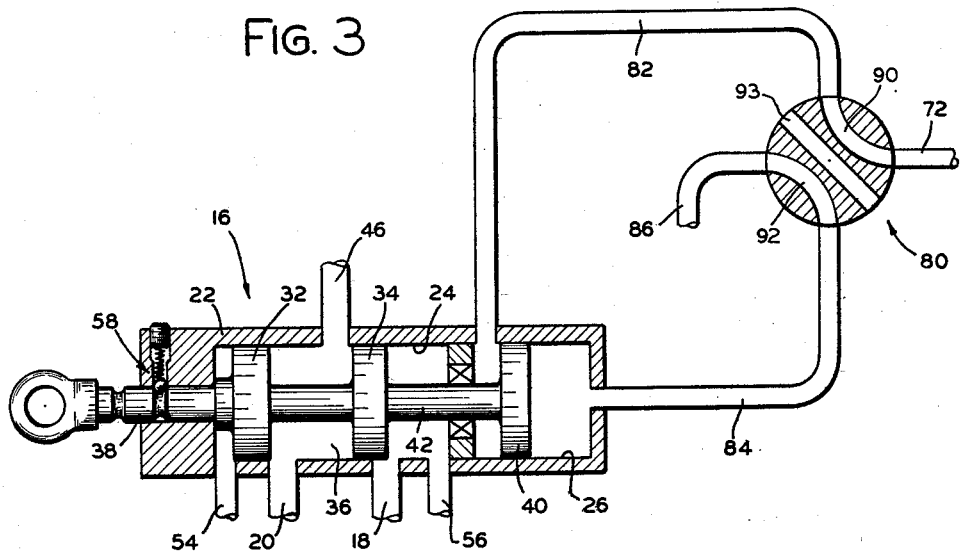
Figure 4:
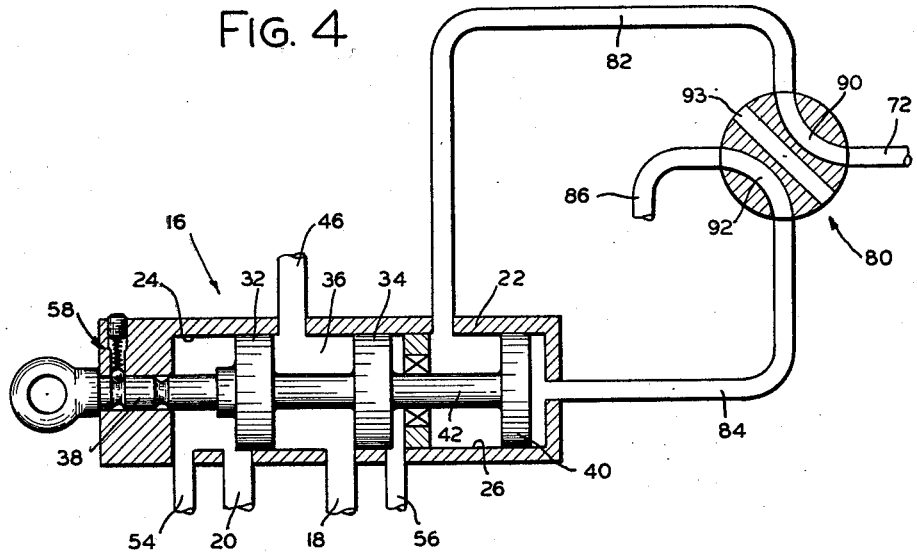

The above objects and other objects, features and advantages of my invention will become more readily apparent to persons skilled in the art from the following detailed description when taken in conjunction with the accompanying drawing in which:

FIGURE 1 is a schematic drawing of a preferred embodiment of my invention shown in a condition such that upon application of the brake the transmission will be shifted from forward to reverse, FIGURE 2 is similar to FIG. 1 except that the brake has been applied, FIGURE 3 is similar to FIG. 1 except that my invention is shown in a condition such that upon application of the brake the transmission will be shifted from reverse to forward, and FIGURE 4 is similar to FIG. 3 except that the brake has been applied.

Referring now to the drawing, the reference numeral 10 denotes a transmission control for use with a vehicle having a power shifted transmission such as that disclosed in the afore-mentioned patent, wherein engagement of a clutch 12 associated with the transmission causes the vehicle to be driven in the forward direction and engagement of a clutch 14 causes the vehicle to be driven in the reverse direction.

The engagement of forward clutch 12 and reverse clutch 14 is controlled by a direction control valve 16 which directs pressurized fluid either to forward clutch 12 or reverse clutch 14 by means of conduits 18 and 20, respectively. The direction control valve 16 is of the type generally referred to as a sliding spool valve and includes a valve body 22 having a pair of coaxially disposed bores 24 and 26 separated by a partition 28 and a spool member 30 slidably disposed within bores 24 and 26.

The spool member 30 has a pair of axially spaced apart annular land portions 32 and 34 slidably disposed in bore 24 which cooperate therewith to define an annular space 36 therebetween. Extending outwardly from land portion 32 is a rod 38 having an enlarged portion 39 adjacent land 32 and an eye connector 41 at the outer end thereof for attachment to a manual control which also serves as a forward and reverse indicator. Rod 38 passes through the adjacent end 43 of valve body 22 and serves as a manual control as will be explained in greater detail hereinafter. The spool member 30 also includes a piston portion 40 slidably disposed in bore 26 and secured to the remainder of spool member 30 by an axially extending rod portion 42 which passes through an annular opening 44 in partition 28. Piston portion 40 is held in axially spaced relation from the adjacent end of valve body 22 or partition 28 to provide an initial pressure chamber by the cooperation of eye connector 41 or enlarged portion 39 with end 43 of valve body 22. Bores 24 and 26 are sealed from each other at opening 44 by an annular seal 45 disposed around rod portion 42 and in opening 44. As will be explained in greater detail shortly, pressurized fluid acting on piston 40 serves to actuate spool member 30 to disengage one of the associated clutches and engage the other of the associated clutches.

A fluid conduit 46 is connected at one end to bore 24 and is arranged to continuously communicate pressurized fluid to annular space 36. The other end of conduit 46 communicates with the fluid in a fluid reservoir 48. Disposed in conduit 46 intermediate the ends thereof is a fluid pump 50 and a constant pressure regulating valve 52 so that fluid drawn from reservoir 48 is supplied to annular space 36 at a constant pressure. In addition to fluid conduits 18 and 20 which communicate with bore 24 there is another pair of conduits 54 and 56 which communicate opposite ends of bore 24 with reservoir 48.

The various fluid conduits communicating with bore 24 and lands 32 and 34 are so arranged that when spool member 30 is in the position shown in FIG. 1 pressure fluid from conduit 46 is directed through space 36 to conduit 18 thereby engaging the forward clutch 12 and at the same time conduit 20 is connected to conduit 54 leading to the reservoir so that reverse clutch 14 is disengaged. Similarly, when the spool member 30 is in the position shown in FIG. 2 pressure fluid from conduit 46 is communicated through space 36 to conduit 20 thereby engaging reverse clutch 14 and at the same time conduit 18 is connected to conduit 56 leading to reservoir 48 so that forward clutch 12 is disengaged.

The direction control valve 16 is provided with a spring loaded ball detent 58 which serves to positively position spool member 30. The ball detent 58 includes a ball 60 arranged to engage a pair of axially spaced apart annular grooves 62 and 64 in rod 38. The ball 60 is urged into forceful engagement with rod 38 and annular grooves 62 and 64 by means of a helical spring 66 disposed in a radially extending spring retaining passage 68 located in valve body 22. The bias of spring 66 on ball 60 is adjustable by means of a threaded adjustment screw 70 which also serves to retain spring 66 in passage 68.

As pointed out previously, pressure fluid acting on piston 40 serves to shift spool member 30. In order to shift spool member 30, pressurized fluid from the brake system is admitted to one side or the other of piston 40. To accomplish this a fluid conduit 72 is connected at one end to a main brake line 74 running from a master brake cylinder 76 having a brake fluid reservoir 77 and which is arranged to pressurize the brake fluid in line 74 upon an operator's depressing a foot pedal 78 connected thereto. The other end of line 74 is connected to a plurality of brake wheel cylinders 75. The other end of conduit 72 is connected to a rotary shift selector valve 80 which may be operated by a lever mounted on the steering column of the tractor or other location convenient to the operator. Also connected to shift selector valve 80 is a pair of conduits 82 and 84 connected at their other ends to bore 26 and disposed on opposite sides of piston 40, and conduit 86 connected to brake fluid reservoir 77.

The shift selector valve 80 includes a turnable member 88 having a pair of allochirally related connecting conduits 90 and 92, and another conduit 93 located therein. The member 88 is actuatable to the position shown in FIG. 1 to connect conduit 72 with conduit 84 and conduit 82 with conduit 86 by means of conduits 90 and 92, respectively; the position in FIG. 3 to connect conduit 82 with conduit 72 and conduit 84 with conduit 86 by means of conduits 90 and 92, respectively; or a position between the positions shown in FIGS. 1 and 3 where conduit 93 connects conduits 82 and 84 and conduits 72 and 86 are blocked. The last-mentioned position of the valve is the "off" or "manual" position of the control.

An adjustable regulating valve 94 is located in conduit 72 upstream of shift selector valve 80 so that a predetermined pressure must be reached in line 74 prior to communicating such pressure to bore 26 to actuate piston 40 to shift spool member 30.

In order to understand the operation of my invention, let it be assumed that the associated vehicle is traveling in a forward direction, that the shift selector valve is positioned as shown in FIG. 1, having been preset by the operator, and further that the pressure regulator valve 94 is set to open when the pressure in line 74 is approximately at full braking pressure, thus permitting limited braking of the vehicle without causing a direction reversal and generally assuring a complete stop of the vehicle when the brake is applied sufficiently strongly enough to cause a direction reversal. Assume further that the vehicle is being operated in a work cycle as outlined previously. As the operator engages the material pile with the bucket of the vehicle and completes the filling of the bucket he begins to brake the vehicle by applying pressure to brake pedal 78 causing the pressure in line 74 to rise and at the same time he manipulates the bucket control with one hand while steering the vehicle with the other hand. Upon sufficient braking of the vehicle the pressure in brake line 74 will become sufficiently high to open regulating valve 94, thus exerting pressure on the side of piston 40 adjacent conduit 84 and causing it to move from the position shown in FIG. 1 to the position shown in FIG. 2, so that the forward clutch 12 is disengaged and the reverse clutch 14 is engaged. Now when the operator releases brake pedal 78 the vehicle will move in its reverse direction and back clear of the material pile. During this reverse movement of the vehicle the operator actuates the shift selector valve 80 to rotate the portion 88 to the position shown in FIG. 3, thereby connecting conduit 72 to conduit 82 via passage 90 and conduit 84 to conduit 86 via passage 92. It will be noted at this point that the shift control valve 16 also is in the position shown in FIG. 3. When the vehicle has backed sufficiently clear of the material pile the operator again brakes the vehicle by depressing brake pedal 78. This braking causes the pressure in line 74 to rise. Upon sufficient braking of the vehicle the pressure in brake line 74 becomes sufficiently high to open regulating valve 94, thus exerting pressure on the side of piston 40 adjacent conduit 92 and causing it to move from the position shown in FIG. 3 to the position shown in FIG. 4 with the result that reverse clutch 14 is disengaged and the forward clutch 12 is engaged. The vehicle is now conditioned to move forwardly, upon release of brake pedal 78, to approach, for example, a truck into which to deposit the load being carried. As the operator approaches the truck he again actuates shift selector valve 80 to the position shown in FIG. 1 and begins braking the vehicle to a controlled stop with the bucket positioned over the truck and finally applies the brake sufficiently strongly enough so that the regulating valve 94 again opens and piston 40 moves from the position in FIG. 1 to the position in FIG. 2 so that spool member 30 is shifted to disengage the forward clutch 12 and engage the reverse clutch 14. It will be noted that during this phase of the operation the operator's hands are free to steer the vehicle and control the bucket to empty it. Now upon releasing the brake pedal 78 the vehicle will move in reverse away from the truck during which time the operator again actuates shift selector valve 80 to the position shown in FIG. 3. After the vehicle is clear of the truck the operator again brakes the vehicle to a stop, sufficiently strong braking causing spool member 30 to move from the position in FIG. 3 to the position in FIG. 4, thus completing one cycle.

While I have described the operation of the vehicle in a condition to make a brake actuated direction reversal, it will be understood that the vehicle can be operated in a conventional manner by positioning shift selector valve 80 so that passage 93 connects conduits 82 and 84 and conduits 72 and 86 are blocked. When valve 80 is in this position actuation of the vehicle braking system will have no effect upon direction control valve 16. Also, the operator can manually shift the direction control valve 16 through the use of a control lever (not shown) which is advantageously attached to eye-connector 41 on the outer end of rod 38.

In view of the above-detailed description of structure and operation it will be seen that I have provided a control which makes it desirable to make the vehicle direction reversals at or near a standstill. Also, my control provides for the operator to be able to shift the function of making a vehicle direction change from his hand to his foot by virtue of allowing the operator to preselect the desired direction change prior to the actual necessity for making the direction change through the use of a shift selector valve 80.

While in the embodiment disclosed herein the shift selector valve 80 must be manually actuated from the position shown in FIG. 1 to the position shown in FIG. 3 and vice versa it will be understood that such actuation could be made automatic following braking of the vehicle, thus eliminating the need for the operator to manually shift selector valve 80 following each reversal of vehicle movement. Also, from a safety standpoint it is desirable to install at a convenient location on the vehicle an indicator to show the operator whether the vehicle is conditioned for forward or reverse drive.

It will be understood that while I have described the operation of my invention with the regulator valve 94 set to open at substantially full braking pressure, that such pressure is adjustable and may be made higher or lower. Further, it is possible to omit the regulator valve 94 completely from the control system and gain the same effect of controlling the pressure required to shift spool member 30 by properly choosing the area of piston 40 in relation to the force required to overcome ball detent 58.

The above description of my invention is illustrative, and should not be considered in any sense as limiting. The scope and spirit of my invention should be determined from the following appended claims in conjunction with the prior art.

I claim:

1. For use with a vehicle having a reversible transmission and a braking system, a control responsive to brake application for reversing the transmission and comprising a means for controlling the transmission drive direction, means operatively connected to the braking system, responsive to brake application and operatively connected to said controlling means for actuating said controlling means to reverse the transmission drive direction, and means operatively connected to said actuating means for selecting either a forward to reverse or a reverse to forward transmission drive direction change.

2. For use with a vehicle having a reversible transmission and a fluid pressure braking system, a control responsive to brake application for changing the transmission drive direction and comprising means for controlling the transmission drive direction, means operatively connected to the braking system, connected to said controlling means and responsive to the fluid pressure of the braking system generated upon brake application for actuating said control means to change the transmission drive direction, and means for preventing actuation of said controlling means until a predetermined fluid pressure is reached in the braking system.

3. For use with a vehicle having a reversible transmission with a pair of fluid actuated forward and reverse direction controlling clutches, a source of fluid pressure and a fluid pressure braking system, a control responsive to brake application for changing the transmission drive direction and comprising a direction control valve for selectively connecting the forward and reverse direction controlling clutches to the source of fluid pressure for engagement, said control valve having a body, a first bore located in said body, a second bore located in said body, said bores being separated by a partition, a spool member slidably disposed within said first bore and operative in one position to engage the forward direction controlling clutch and disengage the reverse direction controlling clutch and operative in another position to disengage the forward direction controlling clutch and engage the reverse direction controlling clutch and a piston slidably disposed in said second bore and connected to said spool member, a shift selector valve operatively connected to the braking system, a pair of fluid conduits for connecting said second bore on each side of said piston with said shift selector valve, said shift selector valve being operative to direct brake fluid pressure to either side of said piston so that said spool member is shifted to one or the other of its positions in response to brake application, and a pressure regulating valve for preventing communication of brake fluid pressure to said second bore upon brake application until a predetermined brake fluid pressure is reached in the braking system.

4. For use with a vehicle having a reversible transmission with a pair of fluid actuated direction controlling clutches, a source of fluid pressure, a fluid reservoir and a fluid pressure braking system, a control responsive to brake application for changing the transmission drive direction and comprising a direction control valve for selectively connecting the direction controlling clutches to the source of fluid pressure for engagement, said control valve having a body, a first bore located in said body, a second bore located in said body, said bores being separated by a partition, a spool member slidably disposed within said first bore and operative in one position to connect one of the clutch with the source of fluid pressure and connect the other clutch to the fluid reservoir and operative in another position to connect the one clutch with the fluid reservoir and the other clutch with the source of fluid pressure and a piston slidably disposed in said second bore and connected to said spool member, a shift selector valve operatively connected to the braking system, a pair of fluid conduits for connecting said second bore on each side of said piston with said shift selector valve, said shift selector valve being operative to connect one of said pair of fluid conduits to the braking system while connecting the other of said pair of fluid conduits to the fluid reservoir or to connect said other conduit to the braking system while connecting the said one fluid conduit to the fluid reservoir so that said spool member is shifted to one or the other of its positions in response to brake application, and a pressure regulating valve for preventing communication of brake fluid to said second bore upon brake application until a predetermined pressure is reached in the braking system.

References Cited in the file of this patent

UNITED STATES PATENTS

| | | |
|---|---|---|
| 2,218,314 | Johnson | Oct. 15, 1940 |
| 2,469,743 | Newton | May 10, 1949 |
| 2,883,015 | Schroeder | Apr. 21, 1959 |
| 2,904,146 | Codlin | Sept. 15, 1959 |
| 2,917,143 | Jenney | Dec. 15, 1959 |